United States Patent [19]

Kupka

[11] 4,160,552
[45] Jul. 10, 1979

[54] SKI SCOOTER

[76] Inventor: Rudolph J. Kupka, 9101 Sheridan Ave., Brookfield, Ill. 60513

[21] Appl. No.: 857,378

[22] Filed: Dec. 5, 1977

[51] Int. Cl.² .............................................. B62B 13/08
[52] U.S. Cl. ................................................. 280/21 R
[58] Field of Search ................ 280/21 R, 16, 87.04 R, 280/87.04 A, 22

[56] References Cited

U.S. PATENT DOCUMENTS

| 1,350,929 | 8/1920 | McCarthy | 280/87.04 R |
| 2,449,336 | 9/1948 | Spitzwieser | 280/87.04 R X |
| 2,894,760 | 7/1959 | Kolstad | 280/22 |
| 3,057,634 | 10/1962 | Long | 280/22 |
| 4,087,106 | 5/1978 | Winchell | 280/16 X |

Primary Examiner—Joseph F. Peters, Jr.
Assistant Examiner—Norman L. Stack, Jr.
Attorney, Agent, or Firm—Dressler, Goldsmith, Clement, Gordon & Shore, Ltd.

[57] ABSTRACT

A foot-propelled ski scooter for improved maneuverability on snow and ice. The ski scooter can readily be converted to a roller skate scooter in summer and vice versa and includes at least one ski assembly having U-shaped wheel-engaging clamps for releasable snap-fitting engagement with the wheels of the scooter. The ski assembly includes a plurality of braces for supporting the weight of the scooter on the ski assembly. Desirably, the braces are adjustable for adjusting the height and alignment of the ski assembly beneath the wheels.

14 Claims, 6 Drawing Figures

U.S. Patent  Jul. 10, 1979  4,160,552
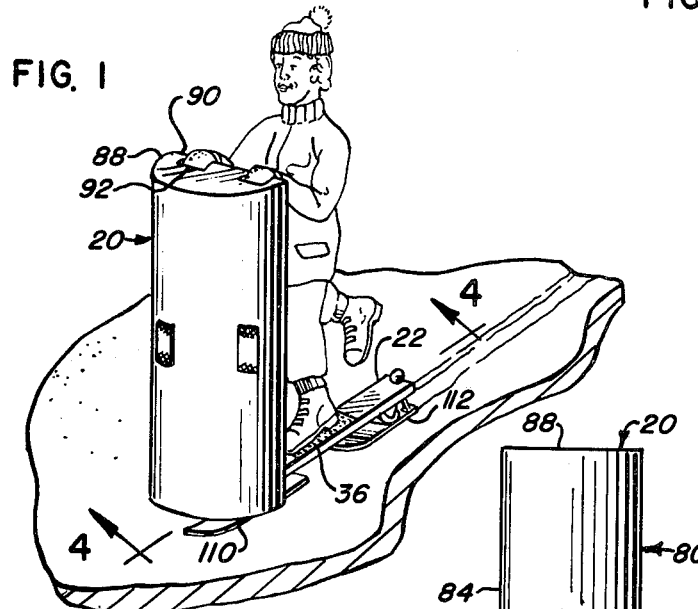
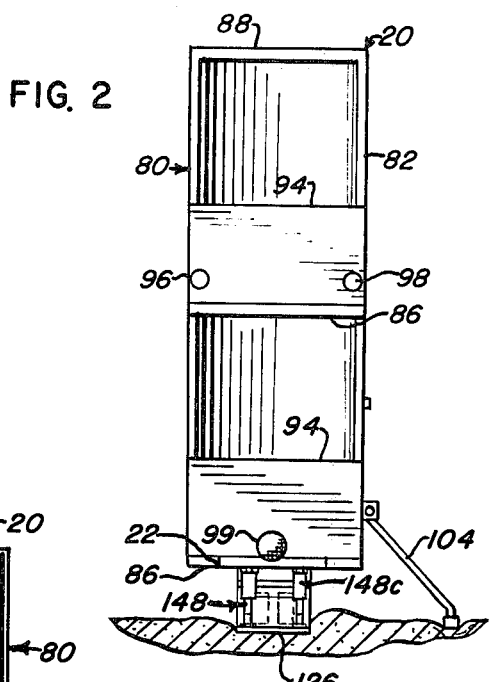
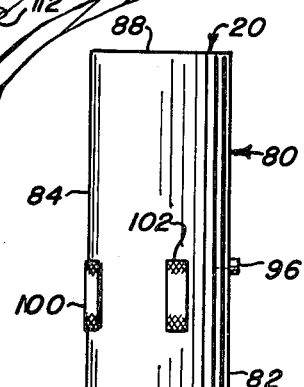
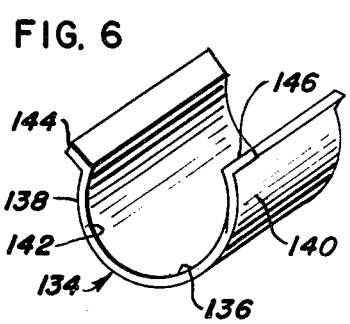
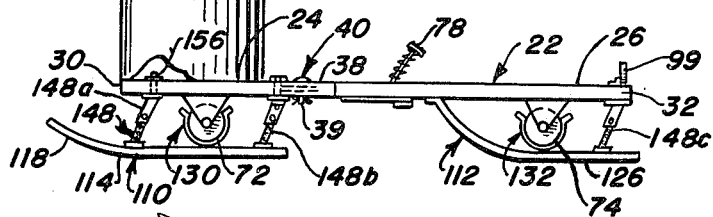
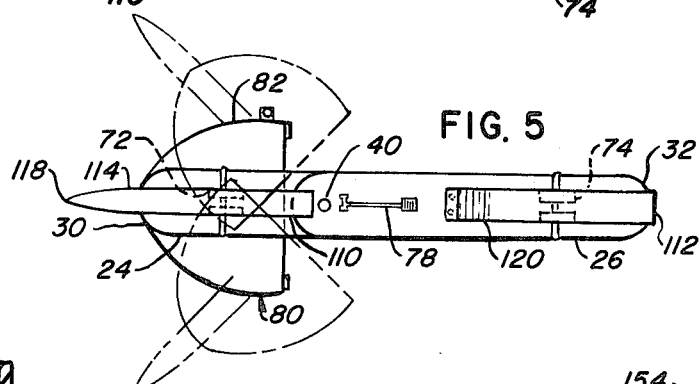
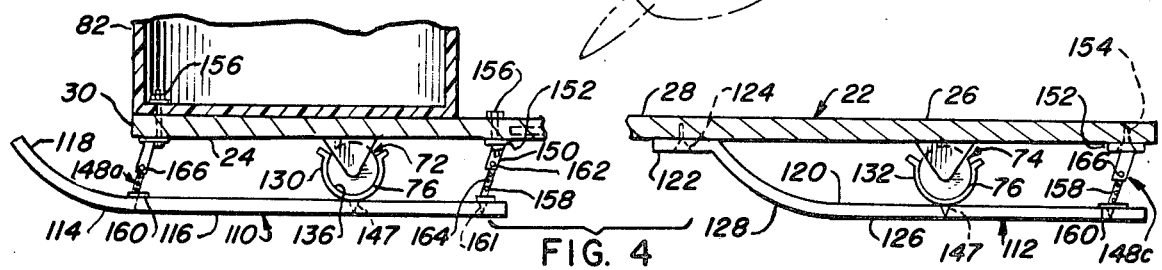

SKI SCOOTER

BACKGROUND OF THE INVENTION

This invention relates to non-motorized vehicles for use in snow and ice, and more particularly, to a non-motorized wheeled ski scooter.

For over 30 years homemade scooters have been built with a wooden orange crate or the like mounted upon a wooden plank and with roller skate wheels mounted to the underside of the plank. These homemade scooters have been used for gliding upon sidewalks, driveways, streets, paved recreational areas and other places.

Conventional commercial versions of the homemade scooter have been made from a single metal plank with rubber wheels mounted to the underside of the plank and a single vertical steering rod connected to the front wheel. These commercial versions are difficult to maneuver and control and are sometimes unstable and present a problem in negotiating curves.

One type of non-motorized wheeled scooter which has been found to be particularly advantageous is found in applicant's U.S. Pat. application Ser. No. 803,134. Unfortunately, this non-motorized wheeled scooter has only limited usage upon snow and ice.

It is therefore desirable to construct a stable non-motorized wheeled scooter which is easy to maneuver and control and which can be readily converted to a ski scooter in winter.

SUMMARY OF THE INVENTION

A non-motorized wheeled ski scooter is provided which is generally stable and easy to maneuver and control. The ski scooter can be readily converted to a roller skate scooter in summer and vice versa.

The scooter includes an elongated support platform for supporting the weight of a child. The support platform is of a width that is preferably slightly larger than the width of a child's foot or boot. Front and rear wheels are operatively connected to the underside of the support platform. In order to maneuver the support platform, a steering assembly is operatively connected to the support platform. The scooter also desirably has a ski assembly that has a portion located below the wheels.

In the preferred form, the ski assembly includes a pair of U-shaped wheel-engaging clamps for releasable snap-fitting interlocking engagement with the front and rear wheels. Each of the U-shaped wheel-engaging clamps has a resilient arcuate inner bearing surface with expandable end portions that are spaced apart from each other so as to define an access opening therebetween. The minimum distance of the access opening between the end portions is normally less than the diameter of the wheel with which it is associated. Desirably, the end portions are expandable to span a distance slightly greater than the diameter of its associated wheel to permit the U-shaped clamp to be inserted and removed from the wheel. In the illustrative embodiment, the U-shaped wheel-engaging clamp also includes outwardly extending finger-gripping flanges to facilitate opening of the end portions.

Desirably, the ski assembly also includes a plurality of braces that are connected to the support platform for supporting the weight of the platform upon the ski assembly. In the preferred form the braces include upper and lower legs which telescope into each other so as to be vertically adjustable. Preferably, the braces are slanted rearwardly to resist buckling during sudden impacts.

In the preferred embodiment, the elongated support platform is articulated and includes a front footboard and a rearward footboard. A coupling assembly pivotally connects the front and rearward footboards in an end-to-end array about a pivot point.

Preferably, the ski assembly includes a forward ski having an upwardly pointed toe connected to the front footboard with the upwardly pointed toe extending forwardly of the steering assembly.

In the illustrative embodiment, the ski assembly also includes a rearward ski that is wider than the forward ski. The rearward ski desirably has a generally planar front portion connected to the underside of the rearward footboard, an elongated generally planar rearward portion spaced beneath the rearward footboard and an intermediate arcuate portion extending between and connecting the front and rearward portions.

A more detailed explanation of the invention is provided in the following description and appended claims taken in conjunction with the accompanying drawings.

BRIEF DESCRIPTION OF THE DRAWINGS

FIG. 1 is a perspective view of a ski scooter in accordance with principles of the present invention;

FIG. 2 is a rearward view of the ski scooter with a kickstand in a downward position;

FIG. 3 is a side view of the ski scooter;

FIG. 4 is an enlarged fragmentary side view of the ski scooter shown in cross-section and taken substantially along line 4—4 of FIG. 1;

FIG. 5 is a bottom view of the ski scooter; and

FIG. 6 is a greatly enlarged perspective view of a U-shaped wheel-engaging clamp.

DETAILED DESCRIPTION OF THE ILLUSTRATIVE EMBODIMENT

FIGS. 1–5 of the drawings illustrate a non-motorized articulated foot-propelled wheeled ski scooter 20 for skiing and sliding upon snow and ice. The ski scooter 20 can freely glide down a snowy hill by either foot propulsion or simply by the action of gravitational forces acting upon the combined weight of the scooter and the child who is operating and riding the scooter.

The scooter 20 includes an articulated support platform 22 which supports the weight of a child. Preferably the articulated support platform is of a width slightly larger than the width of a child's foot or boot, although in some situations it may be desirable that the width of the articulated support platform 22 be slightly greater than the width of a child's two feet in side-by-side relationship. The articulated support platform 22 includes a first elongated front footboard 24 or forward running board and a second elongated rearward footboard 26 or rearward running board. The rearward footboard 26 is normally positioned in longitudinal alignment with and rearward of the forward footboard 24. Each of the footboards has a top surface 28 which is generally planar or flat.

The footboards 24 and 26 are preferably made of plywood, such as ¾ inch plywood, and is of sufficient strength to support the weight of different sized children who may use the scooter 20. Plywood is one type of preferable material because it is rigid enough so as not to buckle, yet is sufficiently flexible enough so as to permit temporary bending or flexing in response to various loads and weights of children. The footboards 24 and 26 should be sufficiently heavy to provide a relatively low center of gravity of the scooter 20 to enhance stability and maneuverability. Preferably, the plywood is treated so as to be water imprevious and resistant to cold weather. When desired, other suitable materials such as plastic or metal can be used in fabricating the footboards.

The front footboard 24 has a rounded front end 30 and the rearward footboard has a rounded rear end 32. In one form the rearward footboard was approximately 24 inches, and was of a sufficient size so that a child could place his foot anywhere along the footboard without substantially affecting the operation and maneuverability of the scooter.

The rearward footboard 26 includes a non-skid portion 36 (FIG. 1) preferably comprising a non-skid sand paint. Under some circumstances, it may be desirable to use paste-on non-skid strips rather than non-skid paint. The footboards 24 and 26 are preferably shellacked before the non-skid portion is applied for ease of cleanliness and to provide a better appearance. When a plastic footboard is desired, grooves are preferably molded in the rearward footboard thereby eliminating the need for non-skid paint or strips.

A coupling assembly 38 (FIG. 3) is provided for pivotally connecting the first or front footboard 24 and the second or rearward footboard 26 together generally in an end-to-end array. The coupling assembly 38 has a pivot pin 39 which generally defines a pivot point 40 that slidably connects a pair of mating die-cast turning plates of the type generally shown and described in Kupka (applicant's), U.S. Pat. application Ser. No. 803,134. In the illustrative embodiment the front footboard 24 has a turning radius which extends along an oblique angle of about 300 degrees about such pivot point as best shown in FIG. 5.

Front and rear wheel assemblies 72 and 74 are bolted or otherwise secured to the underside of the articulated support platform 22 for movement of the scooter upon a paved surface, such as a sidewalk, street, driveway, etc. during summer. The wheel assemblies 72 and 74 are spaced from the coupling assembly 38 so that each of the wheels 76 is necessarily spaced from the pivot point 40. Such positioning provides a larger turning radius for the scooter 20 and generally increases the stability and maneuverability of the scooter 20 on snow and ice.

The front wheel assembly 72 (FIG. 5) has at least one front wheel and preferably a set of front wheels in side-by-side relationship operatively connected and secured to the underside of the forward footboard 24. The rear wheel assembly 74 has at least one rear wheel and preferably a set of rear wheels in side-by-side relationship secured to the underside of the rearward footboard 26. Most preferably each wheel assembly 72 and 74 takes the form of a straight line roller skate truck having a pair of non-driven coaster wheels or casters, made of neoprene or synthetic rubber. Other materials can be used. Each set of wheels are connected to each other by a rigid metal axle capable of withstanding heavy shocks and impact loads. In IN one form the front wheel assembly 72 is located approximately six inches from the front end 30 of the front footboard and the rearward wheel assembly 74 is located approximately six inches from the rear end 32 of the rearward footboard 26. Placement of the wheel in such a manner assists in reducing the impact forces acting upon the coupling assembly 38.

In order to enhance the control of the ski scooter 20, a foot brake assembly 78 (FIG. 3) is operatively connected to the rearward footboard 26 for mechanically stopping the momentum of the scooter. The foot brake assembly 78 can be of the type shown and described in Kupka, U.S. Pat. application Ser. No. 803,134.

The components of the scooter 20 also include a steering assembly 80 (FIG. 3) operatively connected to the first or front footboard 24 for remotely and arcuately maneuvering the first footboard 24 generally in a horizontal plane about the pivot point 40. In the illustrative embodiment the steering assembly 80 takes the form of an upright cab 82 which is mounted upon and supported by the front footboard 24 and is spaced from the coupling assembly 38. In one form, the cab 100 had a horizontal length of about nine inches which was spaced approximately three inches from the pivot point 40, and the forward footboard 24 had a length of about twelve inches with a width and thickness about equal to the width and thickness of the rearward footboard 26.

The cab 82 is desirably of a height less than the height of the child so as not to impair the child's vision and has a semicylindrical shield-like front 84 (FIG. 3) facing in the forward direction for substantially protecting the child from snowballs and other projectiles and for substantially preventing puncturing of other persons and objects during accidental collisions. The curved wall of the cab 82 has a curvature similar to a half of an oil drum. The curvature of the cab 82 assists in minimizing wind resistance. In one form the wall was ¼ inch thick.

Desirably, the front 84 of cab 82 is rigid and strong, but yet is slightly flexible, to resist small impact forces and collision. In the preferred embodiment, the front 84 generally defines a forwardly facing baffle for substantially deflecting the flow of oncoming air and snow generally around the body of the child during propulsion of the scooter 20. Preferably the cab 82 is made of molded impact-resistant plastic so as to be essentially maintenance free. The choice of plastic is believed to have selling appeal and can be provided in a variety of colors. A suitably contoured or curved windshield can be utilized when desired.

In the illustrative embodiment the cab 82 is provided with a plurality of vertically spaced planar or flat horizontal shelves 86 (FIG. 2) which rigidify the semicylindrical wall of the cab 82 and defines storage compartments. A top 88 generally covers the storage compartments. Top 88 preferably takes the form of an arcuate semicircular support member having a rearward edge 90 (FIG. 1) and defines two laterally spaced apertures or hand holds 92 for comfortably receiving the hands of the child (scooter operator). The apertures or hand holds 92 are desirably half-moon or crescent shaped so that the child can easily grasp the top 88 of cab 82.

The shelves 86 (FIG. 2) are accessible from the rear so as to accommodate and carry gloves, scarves, hats, books, toys, food, etc. Each of the shelves 86 is provided with a rearward upright abutment plate 94 to prevent the objects carried on the shelves 86 from falling off during acceleration and deacceleration. In one form the shelves 86 and top 88 were ¾ inch thick.

In some circumstances it may be desirable that the scooter 20 be equipped with a handle bar assembly.

Preferably the scooter 20 includes first and second generally red reflectors or tail lights 96 and 98 (FIG. 2), respectively, which are mounted to opposite sides of the upright plates 94 of the shelves 86 and face rearwardly so that no more than one of the reflectors 96 or 98 will be optically blocked by the operator during propulsion of the scooter 20. A third upwardly extending red reflector or rearward tail light 99 is desirably secured to the rear end 32 (FIG. 3) of the rearward footboard 26. Preferably at least one white reflector 100 (FIG. 3) is mounted and centered on the front of the cab 82 and a pair of yellow reflectors 102 are positioned on opposite sides of the cab 82.

Th scooter can also include a kickstand 104 (FIG. 2) such as shown and described in Kupka, U.S. Pat. application Ser. No. 803,134.

In order to enable the scooter to ski and glide upon snow and ice, such as a frozen pond, a front ski assembly 110 and rearward ski assembly 112 are removably connected to the underside of the articulated support platform 22. The front ski assembly 110 includes a forward ski 114 positioned generally below the front footboard 24. The forward ski 114 has an elongated generally planar rearward portion 116 (FIG.4) and an upwardly extending forward tow 118 extending forwardly of the cab 82.

The rearward ski assembly 112 includes a rearward ski 120 spaced longitudinally rearwardly of the forward ski 114 and positioned generally below the rearward footboard 26. The rearward ski 120 has a generally planar front portion 122 abutting against the underside of the rearward footboard 26 and removably connected thereto by fasteners 124, such as screws or other suitable connecting devices. Desirably, the front portion 122 is positioned generally adjacent and slightly rearwardly of the coupling assembly 38 (FIG. 3). The rearward ski 120 also has an elongated rearward portion 126, which is spaced below the rearward footboard 26 and the rearward wheel 74. Preferably, the rearward portion 126 is generally planar or flat and extends rearwardly of the rear end 32 of the rearward footboard 26 as best shown in FIG. 3. An intermediate arcuate portion 128 extends between and connects the front portion 122 and rearward portion 126 of the rearward ski 120. In the preferred form, the intermediate arcuate portion 128 curves forwardly and is convex.

In the preferred form, the rearward ski 120 is of a greater width than the width of the forward ski 114 to assist in distributing the load forces caused by the weight of the child on the rearward footboard 26. In one form, the rearward ski 120 had a width of five inches and the forward ski 114 had a width of four inches.

In the illustrative embodiment the forward and rearward skis 114 and 120, respectively, are made of impact-resistant plastic, although in some circumstances, it may be desirable to make the skis 114 and 120 out of metal, fiberglass, laminated wood or other material.

One of the many advantages of the present invention is that the skis 114 and 120 can readily be installed and removed from an articulated roller skate scooter of the type shown in Kupka, U.S. Pat. application Ser. No. 803,134, to convert a scooter to a ski scooter in winter and to a roller skate scooter in summer and vice versa.

To this end each of the ski assemblies 110 and 112 have a snap-fitting assembly 130 or 132 which are substantially identical. The snap-fitting assembly 130 and 132 includes a U-shaped wheel-engaging clamp 134 (FIG. 6) having a resilient arcuate inner bearing surface 136 with expandable upper end portions 138 and 140. The expandable upper end portions 138 and 140 are spaced apart from each other to define an access opening 142 therebetween. The minimum distance across the access opening 142 is normally less than the diameter of the wheels 76 with which it is associated.

In order to accommodate insertion and removal of the U-shaped clamp about the wheels 76, the U-shaped clamp 132 is expandable to span a distance slightly greater than the diameter of each of the wheels 76. Outwardly extending finger-gripping flanges 144 and 146 are connected to the tops of the expandable upper end portions 138 and 140, respectively, to facilitate opening of the upper end portions 138 and 140. The U-shaped clamp 134 is connected to the upper surface of the rearward ski portion 116 or 126 by flathead countersunk screws 147 or other fastening means as shown in FIG. 4.

Desirably, the U-shaped clamp 130 associated with the forward ski 114 should be sufficiently wide to snugly engage the front set of wheels 72 and the U-shaped clamp 132 associated with the rearward ski 120 should be sufficiently wide for snugly engaging the rearward set of wheels 74.

Each of the ski assemblies 110 and 112 preferably has braces or struts 148 (FIG. 2) connected to the articulated support platform 22 to assist in supporting the combined weight of the cab 82, articulated support platform 22 and child upon the ski assemblies 110 and 112. In the illustrative embodiment for front ski assembly 110 has a pair of front braces 148a (FIG. 3) positioned forwardly of the front wheel 72 and generally adjacent the front of the cab 82, and has a pair of rear braces 148b positioned rearwardly of the front wheel 72 and generally adjacent the coupling assembly 38. Desirably, the rearward ski assembly 112 has a pair of back braces 148c positioned rearwardly of the rear wheel 74 generally adjacent the rear end 32 of the rearward footboard 26. Preferably, each of the braces 148 is substantially identical in construction and is slanted rearwardly at an acute angle to substantially resist buckling and substantial compressive deformation during sudden impacts.

In the preferred embodiment, each of the braces 148 has an upper leg 150 (FIG. 4) with an upper mounting plate 152 welded thereon. Upper mounting plate 152 is removably connected, such as by screws 154 or bolts 156 or other suitable connection means to the underside of the articulated support platform 22. Each brace desirably also has a lower leg 158 that telescopically engages and receives the upper leg 150. Lower leg 158 has a lower mounting plate 160 welded to the bottom portion thereof. The lower mounting plate 160 is removably connected to the upper surface of the ski 114 or 120 by suitable fasteners 161 or other connection means. In the illustrative embodiment each of the mounting plates 152 and 160 are rectangular and generally planar and are suitable apertured to receive the fasteners 154, 156 or 161.

The upper leg 150 generally forms a metal socket and the lower leg 158 generally forms a solid metal rod. Preferably, the upper leg 150 defines at least one upper aperture 162 (FIG. 4) extending transversely across its width. The lower leg 158 desirably defines a plurality of lower apertures 164 which are vertically spaced apart from each other and extend transversely across through its width. Any of the lower apertures 164 can be aligned in registration with the upper aperture 162 when the lower leg 158 is slid upwardly into the upper leg 150 so as to permit adjustment of the effective vertical height of the brace 148 and alignment of the associated ski assemblies 110 and 112. A fastener, such as a cotter pin or bolt 166 (FIG. 4) is insertable into the aligned apertures 162 and 164 for releasably connecting the lower leg 158 to the upper leg 150.

In use when a child stands upon the non-skid portion 36 (FIG. 1) of the ski scooter 20 upon a snowy or icy incline, such as a sloped snowbank or hill, the ski scooter 20 will smoothly ski and slide downhill by the forces of gravity. Additional momentum can be obtained when the operator repeatedly pushes his free foot or boot against the incline. The child will use the hand holds 92 to turn the cab 82 and the front footboard 24 to easily and safely negotiate curves. When the ski scooter 20 is on relatively flat ice or snow, the child can put one foot or boot on the non-skid portion 36 of the rearward footboard 26 and use the other leg and foot (boot) to push and propel the scooter forwardly, letting the scooter 20 skate and glide when the scooter has sufficient momentum. When the ski scooter 20 is not being propelled, the cab 82 can be kept off the grounds by moving kickstand 104 to the downward position as best shown in FIG. 2.

Although an articulated ski scooter 20 is preferred, the ski assemblies of the present invention can be used on a non-articulated wheeled scooter having only a single running board. In such cases the front and rear ski assemblies can also be connected, if desired, or the ski assembly can be constructed and arranged as a single unitary ski assembly similar to the front ski assembly, but elongated and with two snap-fitting wheel-engaging clamps.

Although an embodiment of this invention has been shown and described, it is to be understood that various modifications and substitutions can be made by those skilled in the art without departing from the novel spirit and scope of this invention.

What is claimed is:

1. A foot-propelled scooter, comprising:
a wheeled scooter having an elongated support platform for supporting the weight of a child, wheel means secured to the underside of said elongated support platform including at least two wheels longitudinally spaced from each other for movement upon a paved surface during summer, and steering means operatively connected to said elongated support platform for maneuvering said elongated support platform; and
removable ski means having a snow-engaging portion positioned substantially beneath the bottom of said wheel means for skiing upon snow and ice during winter, said removable ski means having snap-fitting connection means for releasable snap-fitting interlocking engagement with said wheel means to removably connect said removable ski means to said wheel means and convert said scotter to a ski scooter in winter and vice versa.

2. A foot-propelled scooter in accordance with claim 1 wherein said removable ski means includes a plurality of braces extending between and removably interconnecting said snow engaging portion to said support platform for supporting the weight of said platform upon said ski means, said braces being of a height to space said snow-engaging portion substantially beneath the bottom of said wheel means.

3. A foot-propelled scooter in accordance with claim 2 wherin said braces include adjustable means for adjusting the height of said braces, said adjustable means including an upper leg and a lowe leg for telescopically receiving said upper leg, one of said legs defining at least one aperture and the other of said legs defining a plurality of apertures for selective alignment in registration with said one aperture, and said adjustable means including fastening means insertable in said aligned apertures for releasably connecting said lower leg to said upper leg.

4. A foot-propelled scooter, comprising:
a wheeled scooter having an elongated support platform for supporting the weight of a child, wheel means secured to the underside of said elongated support platform including at least two wheels longitudinally spaced from each other for movement upon a paved surface during summer, and steering means operatively connected to said elongated support platform for maneuvering said elongated support platform;
ski means having a portion beneath said wheel means for skiing upon snow and ice during winter, said ski means having connection means removably connected to said wheeled scooter for converting said scooter to a ski scooter in winter and vice versa;
said connection means having wheel-engaging means removably connected to said two wheels including a pair of U-shaped wheel-engaging clamps for releasable snap-fitting interlocking engagement with said two wheels; and
each of said U-shaped wheel-engaging clamps having a resilient arcuate inner bearing surface with expandable end portions spaced from each other to define an access opening therebetween, the minimum distance of said access opening between said end portions being normally less than the diameter of one of said wheels and said end portions being expandable to span a distance slightly greater than the diameter of said wheel for insertion and removal of said ski means from said wheel.

5. A foot-propelled scooter in accordance with claim 4 wherein said U-shaped clamp including outwardly extending finger-gripping flanges to facilitate opening of said end portions.

6. A foot-propelled scooter, comprising:
an articulated support platform for supporting the weight of a child, said articulated support platform including a front elongated footboard and a rearward elongated footboard normally positioned in longitudinal alignment with and rearward of said front footboard, and coupling means pivotally connecting said front and rearward footboards generally in an end-to-end array and defining a pivot point;
wheel means secured to the underside of said articulated support platform and spaced from said coupling means, said wheel means including at least one front wheel secured to the underside of said front footboard and at least one rear wheel secured to the underside of said rearward footboard;
steering means operatively connected to said front footboard for remotely and arcuately maneuvering said front footboard generally in a horizontal plane about said pivot point; and
ski means connected to said articulated support platform including a forward ski having an upwardly pointed toe connected to said front footboard and a rearward ski connected to said rearward footboard and spaced longitudinally rearwardly of said forward ski, each of said skis having a snow-engaging portion positioned substantially below and aligned generally beneath the bottom of said wheel means.

7. A foot-propelled scooter in accordance with claim 6 wherein said rearward ski has a width greater than the width of the forward ski to assist in distributing the load on said rearward footboard.

8. A foot-propelled scooter in accordance with claim 6 wherein:
said forward ski includes first snap-fitting means for releasable snap-fitting interlocking engagement with said front wheel,
said rearward ski includes second snap-fitting means for releasable snap-fitting interlocking engagement with said rear wheel, and
each of said snap-fitting means includes a generally U-shaped wheel engaging clamp having a resilient arcuate inner bearing surface with expandable end portions spaced from each other to define an access opening therebetween, the minimum distance of said access opening between said end portions being normally less than the diameter of the wheel to which said U-shaped clamp is engaged and said end portions being expandable to span a distance slightly greater than the diameter of said wheel for insertion and removal of said ski from said wheel.

9. A foot-propelled scooter in accordance with claim 6 wherein the forward ski and the rearward ski each include braces connected to the articulated support platform for supporting the weight of the articulated support platform upon said skis, said braces being of a height to space said snow-engaging portion substantially beneath the bottom of said wheel means.

10. A foot-propelled scooter, comprising:
an articulated support platform for supporting the weight of a child, said articulated support platform being of a width slightly larger than the width of a child's foot and including a front elongated footboard and a rearward elongated footboard normally positioned in longitudinal alignment with and rearward of said front footboard, and coupling means pivotally connecting said front and rearward footboards generally in an end-to-end array and defining a pivot point, said front footboard having a turning radius which extends along an oblique angle about said pivot point;
wheel means secured to the underside of said articulated support platform and spaced from said coupling means, said wheel means including a front wheel secured to the underside of said front footboard and a rear wheel secured to the underside of said rearward footboard;
steering means operatively connected to said front footboard for remotely and arcuately maneuvering said front footboard generally in a horizontal plane about said pivot point, said steering means comprising an upright cab secured to said footboard, said cab having a semicylindrical shield-like front facing in the forward direction for substantially protecting said child from snowballs and other projectiles and for substantially preventing puncturing of said objects and persons during accidental collisions, said shield-like front defining a forwardly facing baffle for substantially deflecting the flow of oncoming air and snow generally around the body of said child during propulsion of said scooter, said cab including storage means including a plurality of vertically spaced shelves defining storage compartments and a top generally covering said storage compartments, said top comprising a semicircular support member having a rearward edge, said support member defining at least two laterally spaced apertures for receiving the hands of said child; and
ski means including a forward ski having a pointed forward toe extending forwardly of said cab an a rearward ski spaced rearwardly of said forward ski;
said forward ski having first snap-fitting means for releasable snap-fitting interlocking engagement with the front wheel of said front footboard and said rearward ski having second snap-fitting means for releasable snap-fitting interlocking engagement with the rear wheel of said rearward footboard;
each of said snap-fitting means including a U-shaped clamp having a resilient arcuate inner bearing surface with expandable end portions spaced from each other to define an access opening therebetween, the minimum distance of said access opening between said end portions being normally less than the diameter of the wheel with which it is associated, said end portions being expandable to span a distance slightly greater than the diameter of its associated wheel for insertion and removal upon said associated wheel, and said U-shaped clamp including outwardly extending finger-gripping flanges to facilitate opening of said end portions;
each of said ski means including braces connected to said articulated support platform for supporting the weight of said articulated support platform upon said ski means; and
said rearward ski having a width greater than the width of the forward ski, said rearward ski including a generally planar front portion connected to the underside of said second rearward footboard, an elongated generally planar rearward portion spaced beneath both said rearward footboard and said rear wheel, and an intermediate arcuate portion extending between and connecting said front portion and said elongated generally planar rearward portion.

11. A foot-propelled scooter in accordance with claim 10 wherein:
said wheel means includes a set of front wheels in side-by-side relationship secured to the underside of said front footboard and a set of rear wheels in side-by-side relationship secured to the underside of said rearward footboard; and
said U-shaped clamp associated with said forward ski is of a width to snugly engage the set of front wheels and the U-shaped clamp associated with the rearward ski is of a width for snugly engaging the set of rear wheels.

12. A foot-propelled scooter in accordance with claim 10 wherein each of said braces include:
an upper leg having an upper mounting plate connected to said articulated support platform;
a lower leg telescopically engageable with said upper leg and having a lower mounting plate connected to said ski means; and
fastening means for connecting said upper leg to said lower leg.

13. A foot-propelled scooter in accordance with claim 12 wherin said upper leg defines at least one upper fastening means-receiving aperture and said lower leg defines a plurality of lower fastening means-receiving apertures to receive said fastening means and permit adjustment of the height of said brace.

14. A foot-propelled scooter in accordance with claim 12 wherein said braces are slanted rearwardly for resisting buckling during sudden impacts.

* * * * *

UNITED STATES PATENT AND TRADEMARK OFFICE
CERTIFICATE OF CORRECTION

PATENT NO. : 4,160,552
DATED : July 10, 1979
INVENTOR(S) : Rudolph J. Kupka

It is certified that error appears in the above-identified patent and that said Letters Patent are hereby corrected as shown below:

Column 3, line 60, omit "IN";
Column 6, line 53, "suitable" should be --suitably--;
Column 7, line 53, "scotter" should be --scooter--;
Column 7, line 64, "wherin" should be --wherein--;
Column 7, line 66, "lowe" should be --lower--;
Column 8, line 37, "including" should be --includes--;
Column 10, line 2, delete "and";
Column 10, line 4, "an" should be --and--;
Column 10, line 60, "wherin" should be --wherein--.

Signed and Sealed this

Twentieth Day of November 1979

[SEAL]

Attest:

RUTH C. MASON
Attesting Officer

LUTRELLE F. PARKER
Acting Commissioner of Patents and Trademarks